Oct. 1, 1968  Y. H. INAMI  3,404,041
BATTERY SEPARATOR FOR A FUSED SALT BATTERY
AND METHOD OF MAKING SAME
Filed March 31, 1966
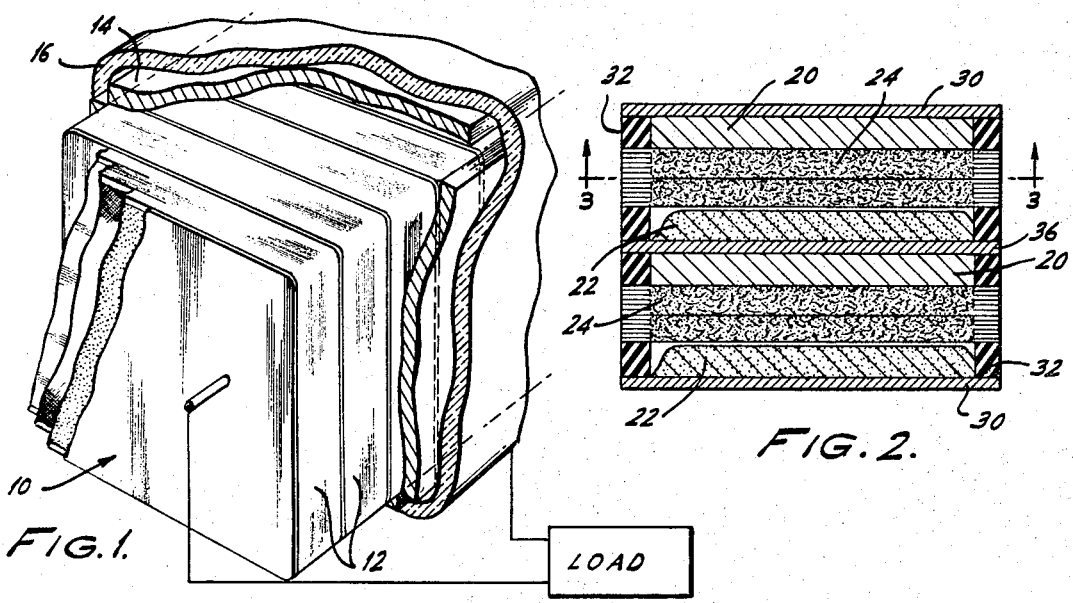
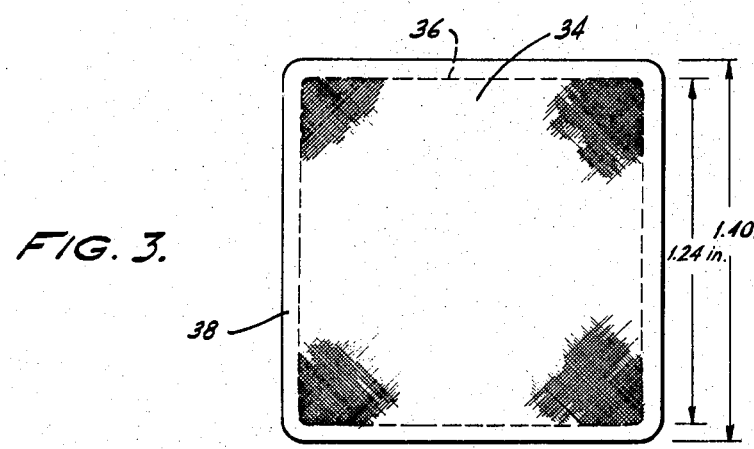
INVENTOR.
YONEMARU H. INAMI
BY
ATTORNEY ated Oct. 1, 1968

3,404,041
BATTERY SEPARATOR FOR A FUSED SALT BATTERY AND METHOD OF MAKING SAME

Yonemaru H. Inami, Norwalk, Calif., assignor to Philco-Ford Corporation, a corporation of Delaware
Filed Mar. 31, 1966, Ser. No. 539,039
7 Claims. (Cl. 136—146)

ABSTRACT OF THE DISCLOSURE

The invention in its method aspect comprises treating a fibrous material, preparatory to its use in a thermal-battery separator, by impregnating the material with a solution containing an alkali or alkaline-earth metal resinate. The impregnated separator is then fired to drive off the solvent and organic portions of the solution and to convert the metallic constituent of the compound to the oxide state. This step is followed by impregnation of the separator with a fusible salt electrolyte.

---

This invention relates to batteries, particularly thermal batteries, and to a novel and improved method for fabricating battery separators, as well as the product produced by such method.

While of broader applicability the invention will be illustrated and described in connection with the fabrication of separators for use in thermally activatable batteries.

Batteries designed for thermal activation make use of solid electrolytes having negligible ionic conductivity under conditions of normal ambient temperature. Activation is accomplished by heating the electrolyte above its melting point. When liquified it becomes a good ionic conductor and the battery becomes electrochemically active. In such batteries the separator is sandwiched between cell electrodes and serves both as an insulative barrier between anode and cathode and as a reservoir for fusible electrolyte. For such a battery to be capable upon demand of reliably supplying fairly large quantities of energy for short periods of time it is necessary that the separator be capable of releasing stored electrolyte uniformly and rapidly on heating thereof to activation temperature.

To achieve high energy density with minimal battery weight, it also is important that a method be provided for improving the ability of fibrous separator material for absorbing fusible electrolyte, without concomitant increase in the size and weight of the separator or its associated parts.

The invention in its method aspect is concerned with treatment of fibrous material preparatory to its use as a separator in a thermal battery to increase its absorptivity of electrolyte. The method comprises, as a first step, impregnating suitable fibrous or filamentary material with a solution containing an alkali, or alkaline-earth metal resinate. The impregnated separator is subsequently fired to drive off the solvent and organic portions of the solution, and to convert the metallic constituent of the compound to the oxide state. This procedure provides optimum dispersion of the oxide in a highly particulate state throughout the matrix of the separator. Selection of an appropriate metallic resinate results in the formation of a material which is highly absorptive of molten salt electrolytes. The mechanism of retention of the pyrolytically processed material by the separator matrix appears to be one of physical entrapment thereof within interstices formed by the filaments comprising the material. Many fibrous materials having the requisite thermal and electrical insulative properties required by a particular battery application may be used to form the separator. Following separator treatment the fusible salt electrolyte selected for use in the battery is melted and allowed to be absorbed by the metal oxide particles carried by and dispersed throughout the separator. The electrolyte after absorption is retained by the separator as an inert solid until activated by application of heat. As previously noted it is necessary that the separator be capable of releasing the stored electrolyte uniformly and rapidly if reliable battery performance is to be obtained.

In achievement of the aforementioned, it is a general object of the invention to provide a method of treating fibrous material which increases its permeability to, and absorptivity of, fusible salt electrolytes, whereby to enable fabrication of improved separators for use in compact thermal batteries of high specific energy having improved activation characteristics.

It is a further object of the invention to provide a process of separator treatment which is inexpensive, simple to practice and reliable in operation.

It is a still further object of the invention to provide a method of treating fibrous separator material which prevents end leakage of electrolyte on thermal activation of the battery whereby both to improve the operating characteristics of the battery and to extend its operational life.

The above mentioned and other objectives within contemplation will be more readily understood by reference to the accompanying detailed description and drawings, in which:

FIGURE 1 is a perspective showing of a thermal battery embodying apparatus of the present invention;

FIGURE 2 is a sectional detail of a pair of battery cells of the kind used in the battery shown in FIGURE 1;

FIGURE 3 is a showing of a separator selectively processed in accordance with one aspect of the present invention;

FIGURE 4 is a flow diagram showing the preferred method of separator treatment.

Referring to FIGURE 1 there is shown a thermal battery 10 comprising a plurality of individual cells 12 electrically interconnected in series circuit. As shown in that figure the cell stack is flanked on each of its longitudinal faces by ignition plates 14 of pyrotechnic heating compound. The plates are placed closely adjacent each of the faces of the stack to improve thermal coupling therebetween. To prevent loss of heat the assembly is enclosed in a thermal insulative wrapping 16, which is preferably of a multilayered type. A thermal battery of the construction shown in FIGURE 1 may be comprised of any number of unit cells and may be designed for substantially constant voltage operation over short periods of time. Operational batteries incorporating separators processed in accordance with the method teachings of the present invention have been made consisting of as many as two hundred unit cells.

Constructional details of a pair of unit cells are shown in FIGURE 2. Each cell comprises a calcium anode 20 and cupric oxide cathode 22, separated by a thin sheet or sheets, of Fiberfrax 24 impregnated with a fusible salt electrolyte. When activated such a cell exhibits an open circuit voltage of approximately 2.4 volts. The cell can maintain a substantially constant terminal voltage of 1.8 volts for three or more minutes working into an external load of one ohm drawing a current of 2 amperes. The battery is thermally activated by igniting the pyrotechnic wafers 14 as by means of a pyrofuse, not shown, triggered by an electrical impulse or other suitable means.

For illustrative purposes the following are exemplary of the physical dimensions of constituent parts of an operative battery constructed as shown in FIGURE 2. The anode 20 may take the form, for example, of a 1.2 inch square punched from a 7 mils sheet of calcium. The separator 24, in its preferred form, is made from ceramic fibers consisting essentially of alumina and silica. One such material obtainable commercially is a ceramic fiber paper sold under the trademark "Fiberfrax." In the cell shown in FIGURE 2 the separator is fabricated from a 1.4 inch square punched from 10 or 20 mil thick Fiberfrax paper. After punching, the separator is treated in the manner to be discussed in detail hereinafter to assure controlled electrolyte impregnation. Preliminary to carrying out the treatment the Fiberfrax paper desirably is heated to a temperature of 450° C. for several hours to minimize subsequent shrinkage of the part. This step while desirable is not essential and accordingly has not been shown in the flow diagram illustrated in FIGURE 4. Heating of the separator also helps to volatilize organic binders within the separator material and aids in driving off absorbed moisture.

Following this bake-out period the paper is treated with a dilute solution of toluene containing a metallic resinate, such, for example, as magnesium resinate or calcium resinate. To provide for selective absorption of electrolyte a narrow peripheral area 38 is left untreated. This results in the formation of an area which resists subsequent electrolyte impregnation and serves as an edge sealant inhibiting escape of electrolyte during cell operation. One technique for selectively treating the separator is simply to mask those portions which are to remain untreated. Unmasked portions may then be coated with the metallic resinate solution by spraying or dipping. Following resinate impregnation the separators are air dryed for several minutes and then subjected to a thermal treatment for 30 to 60 minutes in a muffle furnace maintained at 525°–550° C. Heating of the separator is continued until the treated area turns light gray in coloration. During the firing period the resinate pyrolytically decomposes with the production of considerable amounts of carbonaceous material and with the formation of a particulate dispersion of oxidized metal particles in the form of a finely divided powder. The particles have high electrolyte-absorptivity.

Following oxidation of the metal particles the separator is impregnated with fusible electrolyte.

One convenient means of effecting electrolyte impregnation is to place the heated separator in a recess formed in a graphite template (not shown). A known amount of anhydrous electrolyte is then placed on the separator and the loaded template placed in a muffle furnace maintained at a temperature of about 635° C. Because of its low temperature of activation a preferred electrolyte is a eutectic mixture of potassium chloride and lithium chloride comprising 55% by weight of KCl and 45% by weight of LiCl. It was found, for example, that when using a 20 mil thick Fiberfrax separator having a treated area 1.24 inches on a side that a charge of approximately .56 gram of anhydrous electrolyte provided satisfactory impregnation at a temperature of 635° C. Impregnation takes about four minutes. It should be understood, however, that the temperature at which impregnation occurs is not critical but that the time for completing the process is temperature dependent. It was observed that when small amounts of LiCl-KCl eutectic were placed on the surface of a separator containing treated and untreated portions, and the separator heated in a muffle furnace at 450° C., that no liquid droplets of molten eutectic were observed on the treated portions of the Fiberfrax. As rapidly as the eutectic melted it was soaked up by treated portions of the filamentary material and spread uniformly across the treated area. On untreated portions of the separator droplets of molten eutectic formed with little or no observable wetting. It was discovered that an edge sealant for electrolyte could be provided by leaving a peripheral region on the separator untreated.

Electrolyte is prepared by melting the proper amounts of Analytical Reagent-grade potassium chloride and lithium chloride in a Pyrex tube under an atmosphere of chlorine which is percolated through the molten eutectic for about one hour to remove all water. Following this the solution is treated with argon to expel chlorine and then allowed to solidify under an argon atmosphere. The anhydrous boules or granulers contract away from the Pyrex container and are easily removed for grinding. One practice which has been found acceptable is to grind the boules so formed to a 60 mesh fineness. This granulated material is then used to form pills, preferably of aspirin tablet shape, to facilitate electrolyte impregnation of individual separator sheets.

Because of the extremely hygroscopic nature of lithium chloride, the steps of electrolyte preparation and impregnation of the separator, and all subsequent steps of cell and battery assembly preferably are carried out in dry boxes maintained at a humidity level of about 2% moisture. An additional precautionary measure which may be taken to insure moisture free separators is to store the impregnated separator for at least 16 hours in a vacuum oven maintained at a temperature of 100° C. and a pressure of $10^{-5}$ mm. Hg.

Cells incorporating twenty mil separators processed in accordance with the procedures described above and constructed in the manner shown in FIGURE 2 have exhibited consistently reliable results.

In the assembly shown in FIGURE 2 individual cells 12 are electrically interconnected in series circuit by electrically conductive foil 30 interposed electrode elements of adjacent cells. To prevent electrolytic leakage during battery operation, the electrodes are framed by mica gaskets 32. The cells may be held in stacked form by compressive loading applied through any convenient means, not shown.

A separator selectively treated by the process of this invention is shown in FIGURE 3. The area 34 encompassed by dashed lines 36 is the surface which has been treated with metal resinate solution. The peripheral area 38 between the solid and dashed lines is untreated and as previously mentioned acts as an edge sealant against outflowing of fused electrolyte during cell activation and operation.

In summary I have discovered a unique process for treating filamentary material, such, for example, as exemplified by Fiberfrax, which conditions the material for electrolyte absorption and which enables the construction of thermal batteries of high specific energy having as a component thereof filamentary separators made by such process. Batteries embodying my invention are of improved reliability from the standpoint both of consistently satisfactory operation and in performance. The process consists of impregnating the interstices of the material with an oxidizable metal having a high absorptivity for electrolyte of the type to be used. This preferably is accomplished by treating the material with a solution the solute of which comprises an organic compound containing the desired metal. The organic composed serves as a convenient vehicle for applying the metal to the surfaces of the material and when deposited is readily converted to the oxidized state, in place by pyrolytic decomposition of the compound. By this process the metal is dispersed throughout the filamentary matrix of the material in highly particulate form and when oxidized presents an extensive surface area of high porosity having high absorptivity for fused electrolyte.

While a preferred embodiment, illustrative of the method and apparatus aspects of the invention has been depicted and described, it will be understood by those skilled in the art that the invention is susceptible of changes and modifications without departing from the essential concepts thereof, and that such changes and modifications are contemplated as come within the scope of the appended claims.

I claim:

1. In the manufacture of a battery separator the method which comprises: impregnating said separator with a resinate solution of a metal the oxide of which is electrically non-conductive, and which metal is selected from the group consisting of alkali and alkaline-earth metals; heating the impregnated separator pyrolytically to decompose said resinate and solvent, and to effect oxidation of said metal; and impregnating the treated separator with a fusible salt electrolyte.

2. The method of claim 1 wherein said separator is selectively impregnated to provide a peripheral untreated region which acts as an edge sealant against loss of fused electrolyte.

3. The method of claim 1 wherein said separator is comprised of filaments of ceramic material consisting essentially of alumina and silica, and said metal resinate is selected from the group consisting of magnesium resinate and calcium resinate.

4. The method of claim 1 wherein said electrolyte is a eutectic mixture of lithium chloride and potassium chloride.

5. A battery separator comprising a matrix of filamentary material consisting essentially of alumina and silica impregnated with an electrically non-conductive oxide of a metal selected from the group consisting of alkali and alkaline-earth metals; and said oxide having high absorptivity for fusible salt electrolytes.

6. A battery separator comprising a matrix of filamentary material carrying a particulate dispersion of particles of oxidized metal selected from the group consisting of alkali and alkaline-earth metals and having a high electrolyte-absorptivity and impregnated with a eutectic mixture of lithium chloride and potassium chloride.

7. A battery separtor comprising a matrix of filamentary material containing a particulate dispersion of an oxide of a metal selected from the group consisting of magnesium and calcium and said oxide being impregnated with a fusible salt electrolyte.

References Cited
UNITED STATES PATENTS

| | | | |
|---|---|---|---|
| 2,593,818 | 4/1952 | Waggoner | 117—46 |
| 3,079,454 | 2/1963 | McGinnis | 136—90 XR |
| 3,223,556 | 12/1965 | Cohn et al. | 136—86 |
| 3,258,365 | 6/1966 | Klopp et al. | 136—90 |

WINSTON A. DOUGLAS, *Primary Examiner.*

D. L. WALTON, *Assistant Examiner.*